United States Patent [19]

Dickerson

[11] 4,049,548
[45] Sept. 20, 1977

[54] MOBILE DEMINERALIZER

[76] Inventor: Richard C. Dickerson, 1416 Rust Drive, Virginia Beach, Va. 23455

[21] Appl. No.: 688,147

[22] Filed: May 20, 1976

[51] Int. Cl.² .................. B01D 29/02; C02C 1/70
[52] U.S. Cl. ................. 210/96 R; 210/97;
 210/241; 210/253; 210/264; 210/282; 210/335;
 210/340
[58] Field of Search ............ 210/24 R, 25, 96 R,
 210/97, 152, 241, 252, 253, 263, 264, 282, 322,
 335, 340, 38 B, 38 C, 27

[56] References Cited

U.S. PATENT DOCUMENTS

| 444,754 | /1891 | Knight | 210/253 |
|---|---|---|---|
| 2,454,124 | 11/1948 | Birsch | 210/253 |
| 2,617,766 | 11/1952 | Emmett | 210/96 |
| 2,684,942 | 7/1954 | Tice | 210/253 |
| 2,711,995 | 6/1955 | Sard | 210/25 |
| 2,774,732 | 12/1956 | Blight | 210/25 |
| 2,867,328 | 1/1969 | Sorensen | 210/282 |
| 3,109,810 | 11/1953 | Kruger | 210/282 |
| 3,147,215 | 9/1964 | Blight | 210/24 R |
| 3,224,845 | 12/1965 | Thomas | 210/24 R |
| 3,312,617 | 4/1967 | Klein | 210/24 R |
| 3,454,491 | 7/1969 | Colburn | 210/27 |
| 3,709,818 | 1/1973 | Gustafson | 210/38 C |
| 3,730,770 | 5/1973 | Zievers | 210/24 R |
| 3,945,923 | 3/1976 | Rodgers | 210/253 |
| 3,985,648 | 10/1976 | Casolo | 210/38 B |

Primary Examiner—Wilbur L. Bascomb, Jr.
Assistant Examiner—Ernest G. Therkorn
Attorney, Agent, or Firm—Lane, Aitken, Dunner & Ziems

[57] ABSTRACT

For on-site, continuous, bulk water purification, a dual-monitored, two-pass system employs two successive banks of mixed-bed, strong-based resin cylinders. Raw water first flows down through a bank of primary cylinders in parallel. The outlets of the primary cylinders are connected in parallel via an overhead carry-over pipe to a smaller bank of polisher cylinders whose outlets are connected in parallel via a final filter to a discharge outlet. Probes monitoring the concentration of impurities are located in the carry-over pipe and following the final filter. The efficient arrangement of cylinders in a van allows easy replacement of exhausted cylinders without interrupting water treatment.

12 Claims, 3 Drawing Figures

MOBILE DEMINERALIZER

BACKGROUND OF THE INVENTION

The invention relates generally to the field of water treatment, and more particularly to mobile water demineralization apparatus.

Standard municipal water supplies typically contain various impurities in small concentrations, such as silica, chlorine, calcium and magnesium. However, many industries require large amounts of water of a higher degree of purity, for example, in boilers to prevent scale and corrosion and in chemical processes to insure process integrity. Often these industries have large onsite installations for water purification. A sampling of industries which regularly use high quality water in large quantities includes electric utilities, especially nuclear power plants, steamships, U.S. Navy, U.S. Air Force, U.S. Coastguard, Laboratories, electronics manufacturers, and breweries.

Mobile demineralization units have the advantage that they can provide pure water at any location without requiring the user to make a permanent investment in this type of facility. In addition, the mobile demineralizer is available on an emergency basis when standard equipment fails or is unavailable or inadequate. For example, a particularly advantageous application of mobile demineralizers is providing pure water to steamships at the dock. One drawback of mobile demineralizing units, of course, is that they are limited in the quantity of demineralizing resin that can be carried. One such system previously used a one-pass system through demineralizers in a van but the quality of the water produced was inadequate for many applications. Another type of mobile system previously in use passed water through a large filtration tank. However, the purification operation had to be interrupted periodically to allow the van to return to its home base to replenish the exhausted demineralizing resin.

SUMMARY OF THE INVENTION

The general purpose of the invention is to provide a mobile water demineralization facility with the capability of continuously producing extremely high quality water for any nuclear grade requirement or high purity use with the capability of exchanging the demineralizing resin as it becomes exhausted, on an incremental basis without halting water production at any time. A corollary object of the invention is to provide a configuration for a mobile unit which provides maximum utilization of space in an otherwise standard van and allows easy replacement of demineralizing resin.

These and other objects of the invention are accomplished in a mobile demineralizer for on-site, continuous, bulk water purification using a dual monitored two-pass system through two banks of strong-based, mixed-bed resin cylinders. Raw water is introduced in parallel to a bank of primary cylinders. The outlets of the primary cylinders are connected in parallel via an overhead carry-over pipe to a bank of polisher cylinders fewer in number than the primary cylinders, but filled with the same mixed-bed resin. The outlets of the polisher cylinders are connected in parallel via a final filter and water meter to a discharge outlet. Probes monitoring the concentration of impurities are located in the carry-over pipe between the primary and polisher cylinders and following the final filter. The cylinders are arranged in a special space saving configuration in a standard van with quick-disconnect valves permitting easy replacement of exhausted cylinders without interrupting water treatment.

BREIF DESCRIPTION OF THE DRAWINGS

Figure 3:
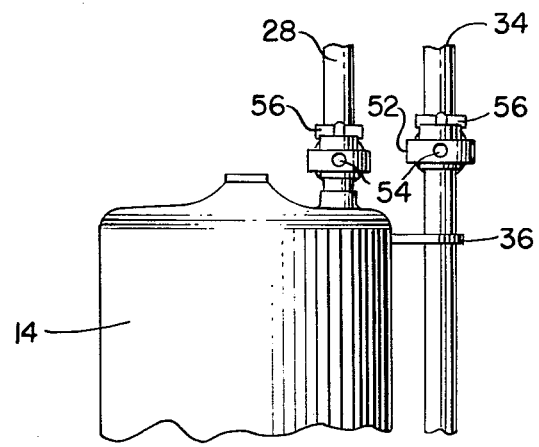

FIG. 3. is a detail perspective view of the top of a representative cylinder.

DESCRIPTION OF THE PREFERRED EMBODIMENT

Figure 1:
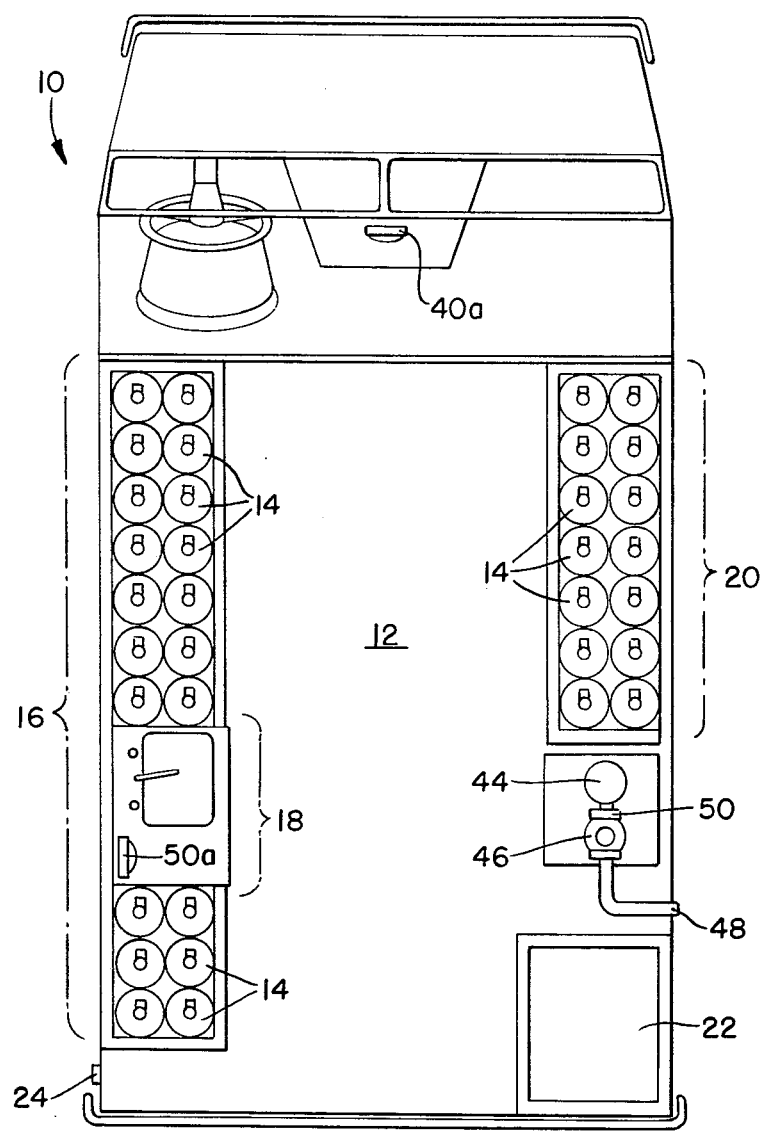
FIG. 1 is a plan view of a mobile demineralizer van with the top removed to show the configuration of demineralizer cylinders.
Figure 2:
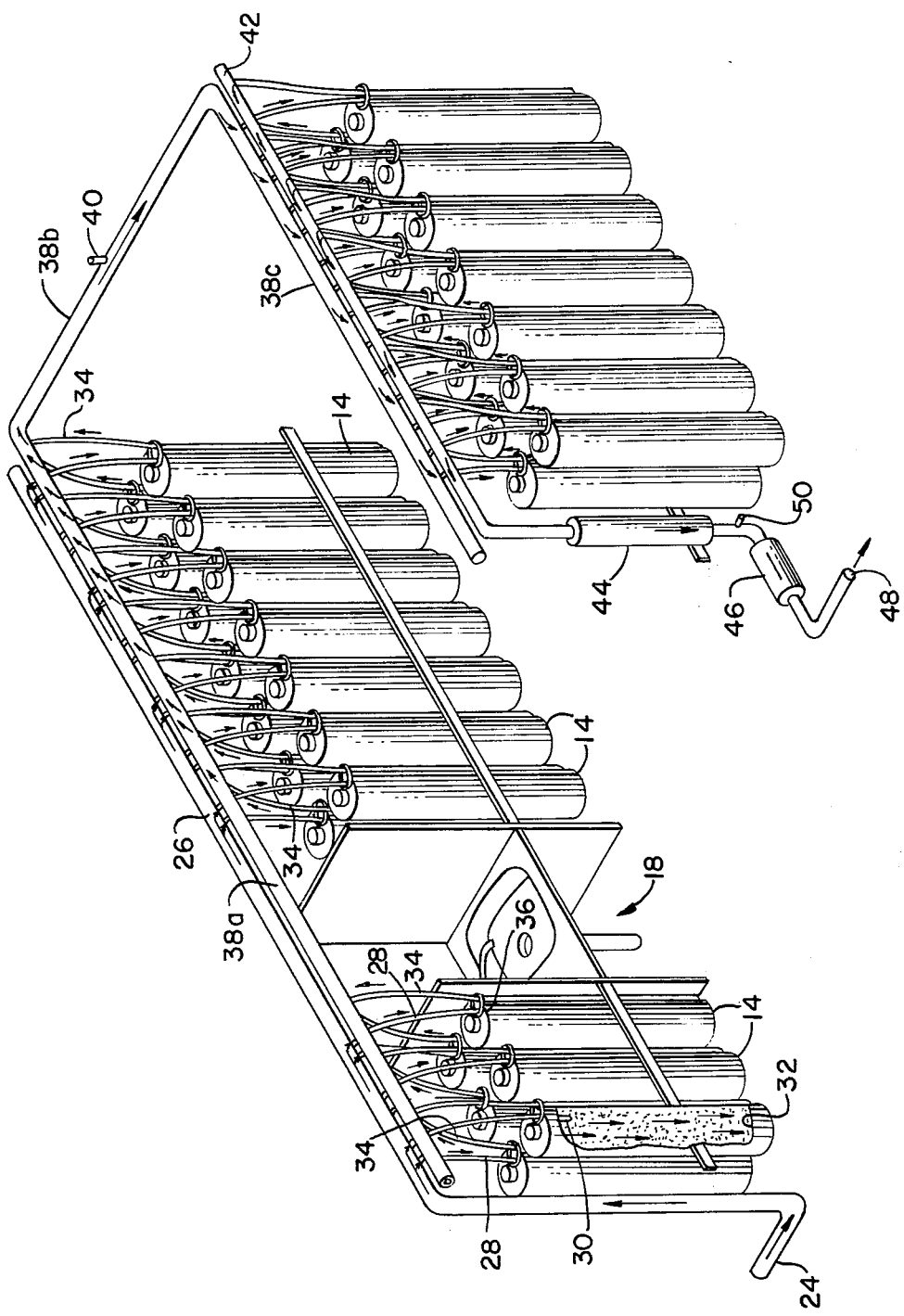
FIG. 2 is a schematic flow diagram illustrating a perspective view of the cylinders and associated water distribution system.

The mobile demineralizer shown in FIGS. 1 and 2 is designed to provide an unlimited quantity of extremely high quality water on a continuous basis at any location. Normal procedure is to take municipal water from the nearest fire hydrant and pass it through the demineralizing van. Quality control is assured through the constant supervision of field operators who remain with the mobile unit whenever it is in service.

FIG. 1 shows a standard step van 10. The rectangular storage area 12 in the back of the van 10 houses two banks of commercially available strong-based, mixed-bed demineralizer cylinders 14. Each cylinder is charged with anion and cation resins in a ratio of approximately two to one. The cylinders typically measure 8 inches in diameter and about 36 inches in length and are vertically oriented.

A bank 16 of 20 primary cylinders 14 is arranged in two rows along the left sidewall of the storage compartment of the van as viewed in FIG. 1. An optional test bench 18 with a sink can be inserted in the primary cylinder bank 16 against the sidewall of the van. A second bank 20 composed of 14 cylinders 14 is arranged in two rows against the right sidewall of the storage compartment 12 as shown in FIG. 1. The cylinders in the second bank 20 are referred to as "polishers."

Bulkheads and railings are used as necessary to retain the cylinders in the configuration as shown in FIG. 1 during travel. However, any appropriate system of tie-down straps or receptacles for restraining the cylinders can be used. The furthest aft portion of the storage area 12 along the right sidewall comprises a storage cabinet 22 housing spare parts, fittings, hoses, boots, etc. The interior volume of the storage area 12 between the primary and polisher banks 16 and 20 can be used for spare cylinders as well as a work area for service personnel.

In FIG. 2 the water distribution lines of the system are illustrated. Raw water enters the mobile demineralizer van 10 via a standard 2½ inch firehose fitting 24 on the left side of the van at the rear as shown in FIG. 1, and is passed to the bank 16 of primary cylinders via a three inch overhead input manifold pipe 26 (not shown in FIG. 1) which extends over the two rows of primary cylinders inside the van 10. The input manifold pipe 26 has 20 outlet fittings (not shown), one for each of the 20 primary cylinders. Each outlet fitting of the input manifold pipe 26 is connected via a short length of plastic tubing 28 to a respective one of the primary cylinders. The plastic tubing 28 extends to a ¾ inch opening in the top of the cylinder 14 and terminates in a top distributor 30 comprising a ¾ inch six inch length of perforated (60 mesh) plastic tubing through which the raw water is introduced into the mixed-bed resin in the cylinder. The raw water flows down through the mixed-bed resin in each of the primary cylinders and is collected in a bottom distributor 32 which is a horizontal section of perforated plastic like the top distributor lying approximately on the bottom of the cylinder. The bottom distributor 32 is connected to a suitable fitting in the bottom of the cylinder 14 to a galvanized riser 34 which extends upwards along the outer circumference of each cylinder through a locating collar 36 to an overhead primary carry-over manifold pipe 38a. As in the case of the input manifold 26 the carry-over manifold 38a has 20 fittings receiving tubing 34 from each of the cylinders in the primary bank 16. Thus the raw water is introduced in parallel to all of the cylinders 14 in the primary cylinder bank 16, and water which has flowed down through the mixed-bed resin is taken out through the bottom distributor 32 and passed in parallel through the outlet tubing 34 to the carry-over manifold 38a.

The primary carry-over manifold pipe 38a passes the output of the primary cylinder bank 16 through a transverse section of pipe 38b at the upper forward end of the storage compartment 12 in the van 10. A total dissolved solids probe 40 is located midway along the pipe section 38b to measure the conductivity of the water and thus to derive the extent of demineralization at this point in the process. The transverse segment 38b of carry-over pipe leads to a secondary carry-over manifold pipe segment 38c which extends over the polisher cylinder bank 20 providing 14 outlet fittings for introducing semi-purified water into the polisher cylinders via tubing 28 as in the primary cylinders 16. Purified water collects at the bottom of the polisher cylinders and is passed by a bottom distributor 32 and outlet riser tubing 34 to a discharge manifold pipe 42 which has 14 fittings receiving the outlet ends of the tubing 34 from the polisher cylinders. The discharge manifold pipe 42 passes the finished water through a 25 to 30 micron final filter 44 of conventional construction and a three inch water meter 46 to a demineralized water discharge outlet 48 in the form of a 2½ inch firehose connection located on the right side of the van 10 (as viewed in FIG. 1). A conductivity probe 50 is located between the final filter 44 and the water meter 46.

The purpose of the final filter is tp protect against introduction of resin into the water stream by a damged bottom distributor in any of the cylinders 14. If this happens, the final filter takes the resin out.

The conductivity probe 40 on the carry-over pipe segment 38b is electrically connected to a meter 40a located on or near the dashboard of the van 10. The meter 40a reads total dissolved solids in parts per million (PPM) and allows the service personnel to perform intermediate process monitoring to guard against depletion or exhaustion of any of the cylinders in the primary cylinder bank 16. The second conductivity probe 50 is connected to a meter 50a located on the left sidewall of the van 10 directly above the test bench 18. The meter 50a reads directly in micromhos to indicate the concentration of ions in the finished water product.

FIG. 3 shows in detail the fittings and valves associated with a representative cylinder 14, enabling removal and replacement of individual cylinders without interrupting water treatment. Each cylinder 14 as shown in FIG. 1 has the same equipment as shown in FIG. 3. Immediately above the collar 36 are detachable yokes 52 which are held in place with knurled bolts 54. The ends of the corresponding inlet and outlet tubing 28 and 34 for the cylinder are received in the yoke 52. Unbolting yoke 52 disconnects the tubing from the cylinder. Behind the yokes 52 are a pair of manual butterfly or gate-type valves 56 inserted respectively in the inlet and outlet tubing 28 and 34. In removing a cylinder, 14, the technician flips the valves 56 one turn to shut off the water flow to the cylinder, unbolts the yoke 52 by hand and removes the cylinder which weighs about 100 lbs. carrying approximately two gallons of water. A fresh cylinder 14 is placed in position, and after reconnecting the tubing 28 and 34, the valves 56 are opened. This procedure is repeated until all of the exhausted cylinders have been replaced.

In operation, a nuclear power plant, for example, which needs a large quantity of high grade water on an emergency basis, places a call to the nearest mobile demineralizer service center. One or more vans equipped as shown in FIGS. 1 and 2 are dispatched to the site. Before demineralization begins, the service technician performes a chemical analysis of the raw water at the test bench 18. The demineralized water outlet fitting 48 is connected directly to a supply pipe running to the nuclear power plant facility. The inlet fitting 24 is connected to a municipal water supply (fire hydrant) or any other suitable source of municipal grade water. The water supply should have a minimum pressure of 40 pounds per square inch. If adequate water pressure is not available at the site, a mobile power booster pump may be used between the source and the raw water inlet 24 of the mobile demineralizer. The raw water flows into the input manifold pipe 26, down through the primary cylinder bank 16, from the primary cylinders around the overhead carry-over pipes 38a, 38b and 38c, into the polisher cylinder bank 20, from the polisher cylinders to the discharge manifold 42, passing through the filter 44 and water meter 46 to the demineralized water outlet 48 at a nominal flow rate of 100 gallons per minute. At this rate, it takes water roughly 40 to 45 seconds to flow through the mobile demineralizer. The standard procedure calls for routine water analysis every hour along with water meter readings. The quality is also monitored constantly with the conductivity meters 40a and 50a. As the demineralizer cylinders 14 are exhausted, they are replaced individually one at a time without disrupting the water service. The exhausted demineralizer cylinders are returned to the nearest plant for regeneration; thus no regeneration waste disposal problem is created at the site. For relatively long term operation, the mobile demineralizer will require at least one additional support vehicle for transporting demineralizer cylinders to and from the on-site mobile demineralizer, which remains hooked up and in operation at all times.

The quality of water in the above described system is available to less than one micromho with a silica concentration of one PPB and one PPB for chloride and sodium ions.

The invention may be embodied in other specific forms without departing from its spirit or its central characteristics. The present embodiment as shown and described in connection with FIGS. 1, 2, and 3 is therefore to be considered in all respects as illustrative and not restrictive. The scope of the invention is indicated by the appended claims rather than by the foregoing description, and all changes which come within the meaning and range of equivalents of the claims are therefore inteded to be embraced therein.

What is claimed is:

1. A mobile demineralizer, comprising a power driven vehicle, having a driver's area a set of primary demineralizing cylinders arranged together in an adjacent upright parallel configuration in said vehicle, a set of secondary demineralizing cylinders comprising a smaller number than said set of primary cylinders, arranged together in an adjacent upright parallel configuration in said vehicle, said primary and secondary cylinders each having a top inlet and a bottom outlet being individually detachable and containing a mixture of strong acid, strong base demineralizing resin, inlet means adapted to be connected to a source of raw water under pressure for supplying water to the inlets of said primary cylinders in parallel, a carryover pipe, means for connecting the outlets of said prmary cylinders to the inlet of said carryover pipe in parallel, intermediate probe means for producing an electrical output indicative of the concentration of ions in the water located in the carryover pipe, means for connecting the outlet of said carryover pipe to the inlets of said secondary cylinders in parallel, filter means for removing any of the demineralizing resin found in the water, means for connecting the outlets of said secondary cylinders in parallel to the input of said filter means, and discharge outlet means connected to receive the output of said filter means for providing a continuous supply of demineralized water, said continuous supply of demineralized water being maintained during removal and replacement of individual exhausted cylinders.

2. The mobile demineralizer of claim 1, further comprising final probe means for producing an electrical output indicative of the concentration of ions in the water operatively located between said filter means and said discharge outlet means.

3. The mobile demineralizer of claim 1, further comprising a water meter operatively connected between said filter means and said discharge outlet means to register the quantity of finished water.

4. The mobile demineralizer of claim 1, wherein said vehicle includes a storage area having two opposite sidewalls against which said sets of primary and secondary cylinders are respectively arranged.

5. The mobile demineralizer of claim 4, further comprising a sink and test bench provided against one of the sidewalls between the cylinders of one of said sets.

6. The mobile demineralizer of claim 4, wherein said primary and secondary cylinders are each arranged in respective double rows along the respective sidewalls of said vehicle storage compartment, said storage compartment having means for retaining said cylinders in their respective positions during travel, the space between said double rows of primary and secondary cylinders being sufficient to permit access to and removal of individual cylinders for replacement.

7. The mobile demineralizer means of claim 1, further comprising a meter displaying total dissolved solids located in the driver's area of said vehicle responsive to the electrical output of said intermediate probe means.

8. The mobile demineralizer of claim 1, wherein said carry-over pipe is located at a level higher than the top of said cylinders.

9. The mobile demineralizer of claim 8, wherein the means for connecting the outlets of the primary cylinders to the inlet of said carry-over pipe includes a primary manifold pipe having a series of inlet fittings along the length of said primary manifold pipe equal to number of primary cylinders, said pipe being arranged directly above and extending the length of the configuration of primary cylinders and having one end coupled to the inlet of said carry-over pipe, and means for forming a fluid connection between the outlets of said primary cylinders and the inlet fittings on said primary manifold pipe.

10. The mobile demineralizer in claim 9, wherein said means for connecting the outlet of said carry-over pipe to the inlets of said secondary cylinders includes a secondary manifold pipe mounted above and extending the length of the configuration of said secondary cylinders and having a number of outlet fittings equal to the number of secondary cylinders and having one end coupled to the outlet of said carry-over pipe, and means for forming a fluid connection between the outlet fittings of said secondary manifold pipe and the inlets of the secondary cylinders.

11. The mobile demineralizer of claim 10, wherein said inlet means connected to a source of raw water includes an inlet manifold pipe mounted directly above and extending the length of the configuration of said primary cylinders in parallel juxtaposition with said primary manifold pipe and having a plurality of outlet fittings equal to the number of primary cylinders and means for forming fluid connection between each outlet fitting of said inlet manifold pipe and the inlet of the corresponding primary cylinder.

12. The mobile demineralizer of claim 11, wherein said means for connecting the outlets of said secondary cylinders in parallel to said filter means includes an outlet manifold pipe mounted above and extending the length of the configuration of secondary cylinders and in parallel juxtaposition to said secondary manifold pipe operatively connected to the inlet of said filter means and having a plurality of inlet fittings equal to the number of secondary cylinder outlet fittings, and means for forming fluid connections between each inlet fitting of said outlet manifold pipe and the outlet of the corresponding secondary cylinder.

* * * * *